J. S. W. CANNELL.
CEMENT CURB AND GUTTER MOLD.
APPLICATION FILED SEPT. 12, 1911.

1,034,074.

Patented July 30, 1912.
2 SHEETS—SHEET 1.

WITNESSES

INVENTOR
James S. W. Cannell

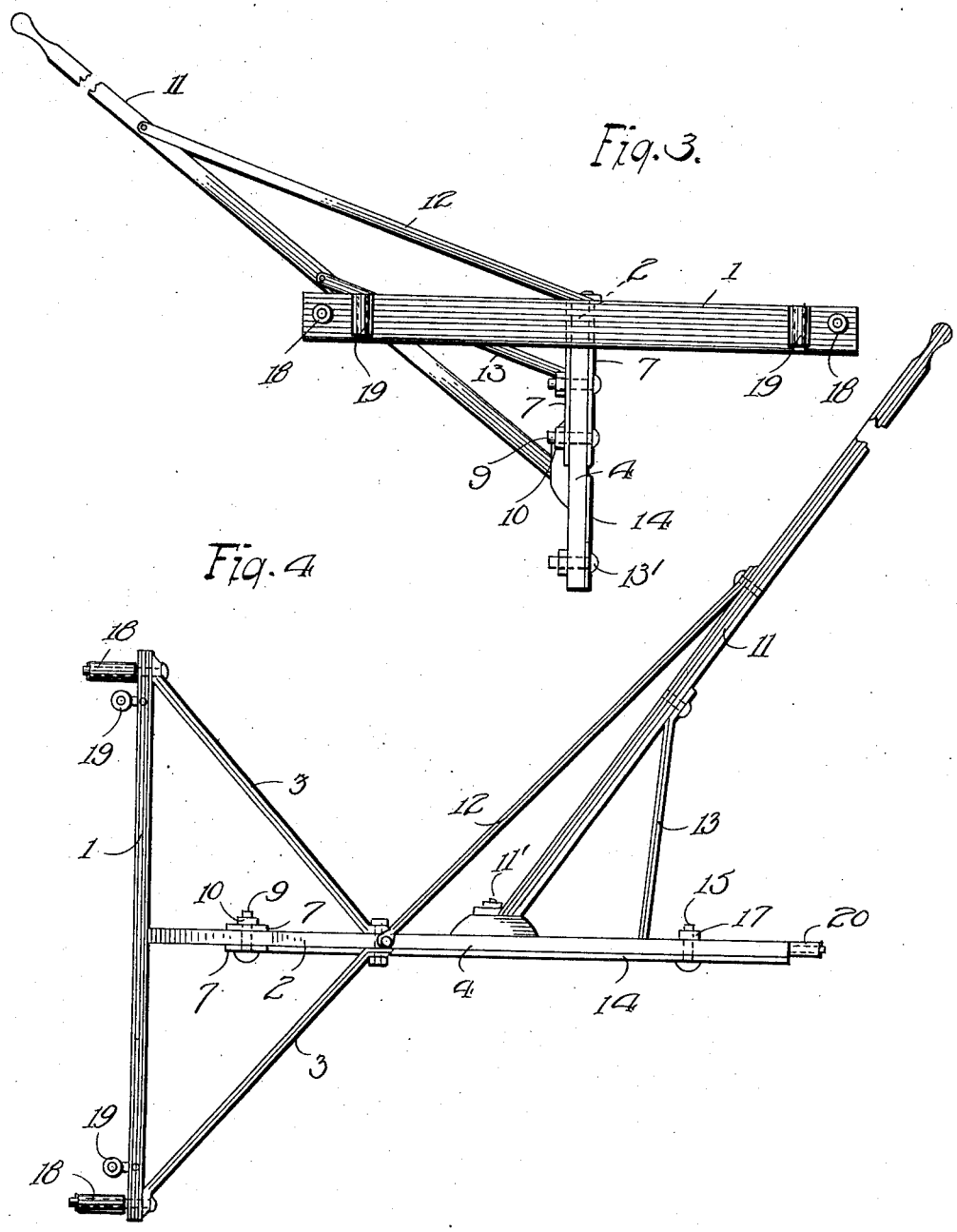

UNITED STATES PATENT OFFICE.

JAMES STEPHEN WOOD CANNELL, OF SHENANDOAH, IOWA.

CEMENT CURB AND GUTTER MOLD.

1,034,074.  Specification of Letters Patent.  Patented July 30, 1912.

Application filed September 12, 1911. Serial No. 648,933.

*To all whom it may concern:*

Be it known that I, JAMES S. W. CANNELL, a subject of the King of England, residing at Shenandoah, in the county of Page and State of Iowa, have invented certain new and useful Improvements in Cement Curb and Gutter Molds, of which the following is a specification, reference being had therein to the accompanying drawing.

This invention relates to devices for molding street curbs and gutters from plastic material in which the plastic material, as for example cement, while held in a plastic condition, in a temporary mold, has its upper surface worked over to form the desired concrete for the curb of the gutter.

The invention has for its object to provide an improved device of this kind so constructed and arranged that the upper surface of the plastic material from which the curb and gutter are made may be readily formed.

Figure 1:
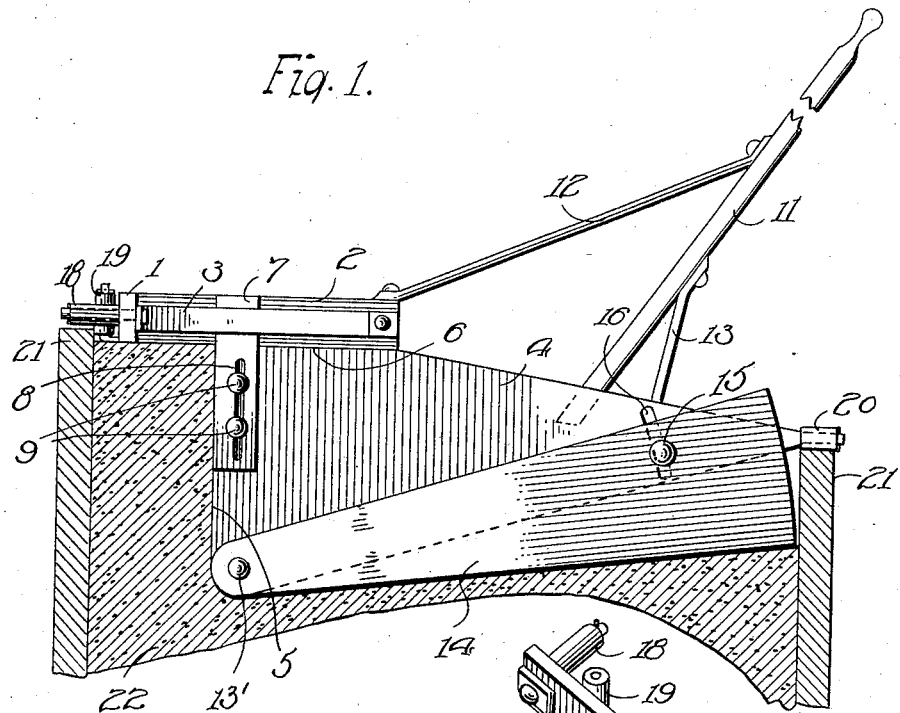
Figure 2:
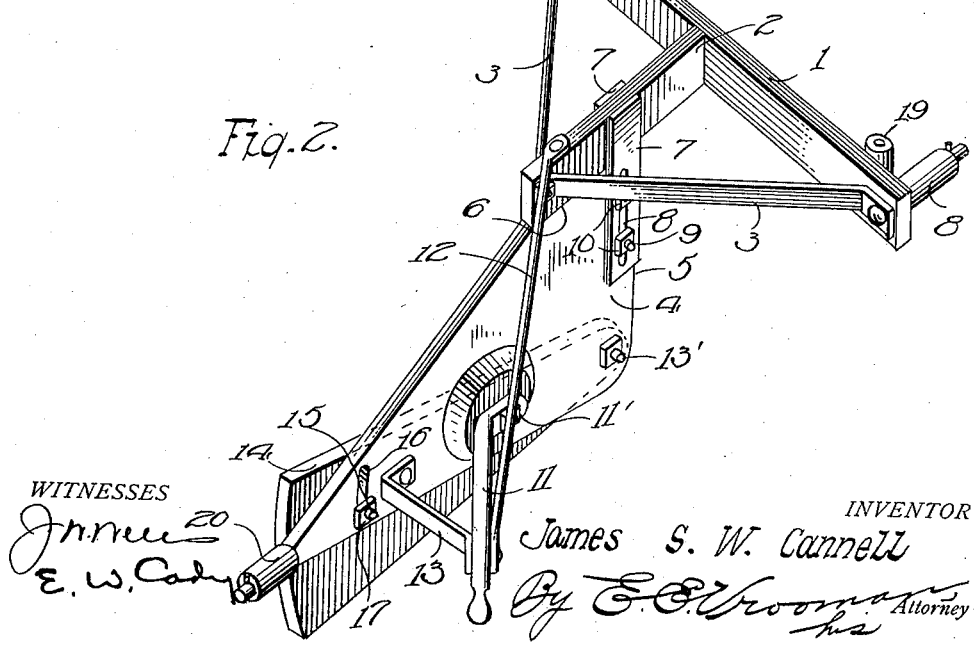

Referring to the accompanying drawings: Figure 1 is a side view of a device constructed in accordance with this invention and shown in position to form the contour of the surface of the curb and gutter in a mass of plastic material held in place by a temporary mold. Fig. 2 is a view in perspective of the device constructed in accordance with this invention for forming the contour of the surface of a curb and gutter. Fig. 3 is a view of the device looking at the front end thereof. Fig. 4 is a plan view of the device constructed in accordance with this invention.

In carrying out the invention the device is constructed with a longitudinal strip 1, which may be made of wood or metal and with a strip 2 of similar material projecting centrally from the rear of the strip 1 between its ends. The strip 2 is braced by means of diagonal bars 3 connected at their ends to the strips 1 and 2. Located beneath the strip 2 and in alinement therewith and projecting outward therefrom is a mold board 4, which may be made of wood or metal and which has a vertical edge 5 at its forward end and extends rearwardly in the form of a triangle, the mold board 4 being formed at its upper edge adjacent to its forward end with a straight portion 6 situated beneath the strip 2. The forward end of the mold board 4 is provided with vertically adjustable plates 7 the upper ends of which clamp the strip 2, each of said plates 7 having a longitudinal slot 8 through which project bolts 9, each having a nut 10 by means of which the plates 7 may be vertically adjusted on the mold board 4. The device is provided with an operating handle 11 which extends at an angle obliquely from the device at one side thereof, so as to permit the operator by means of the handle 11 to push the device forward over the plastic material without walking on the same, the position of the handle being such that the operator may walk along the side of the temporary mold. The handle 11 is braced by a diagonal brace rod 12 secured thereto and to the strip 2 and is also braced by a diagonal rod 13 secured to the handle and the mold board 4. The handle 11 is secured at its inner end to the mold board 4 in any suitable manner, as for example by a nut and bolt 11'. Pivoted to the bottom at the forward end of the mold board 4 by means of a nut and bolt 13' is a wing board 14 forming a vertical extension of the mold board 4 and serving by being raised and lowered to adjusted position to determine the slope of the gutter.

The wing board 14, which, as shown, is of a triangular shape diverging at its outer end, is held in position on the mold board 4 and is adjusted thereon by means of a bolt 15 projecting through a slot 16 in the mold board 4 and provided with a nut 17 by means of which the wing board 14 may be held in adjusted position. The strip 1 is provided at each end with a horizontal roller 18 and adjacent thereto with a vertical roller 19 and the mold board 4 is provided at its inner end with a horizontal roller 20. By means of these rollers the device may be readily moved along, the rollers 18 being adapted to rest on the upper edge of a plank 21 forming one of the sides of a temporary mold and the rollers 19 are adapted to bear against the sides of said plank 21. The roller 20 on the mold board 4 rests upon and is adapted to ride over the upper edge of a second plank 21, which forms the other wall of the temporary mold for containing the plastic material 22.

The operation of the device is as follows: The temporary mold being filled with plastic material the device shown in Fig. 2 is placed in position, as shown in Fig. 1, and is pushed over the top of the plastic material by means of the handle 11, the rollers 18 and the rollers 20 moving over the upper edge of the sides of the temporary mold. In this movement of the device the forward end of the mold board 4, which may be made of the desired shape to form the contour of the curb, forms such curb as the device is moved along and the lower edge of the pivoted wing 14 forms the slope of the gutter according to the position in which the wing 14 is adjusted.

By means of this device the desired contour of any structure whether round or straight may be formed by having the mold board formed in such shape. By means of this construction plain or fancy work may be shaped, including cement steps, as well as curved and circular work may be performed by working the device on a radius with the guide members of the mold conforming to such shape. The handle of the device may be of cast iron or wrought iron and of any desired length and the several strips hereinbefore described may be of wood or metal or of wood faced with galvanized molding plates.

What I claim is:—

1. In a device of the kind described, a longitudinally movable frame, a mold board projecting laterally from said frame, clamping plates connecting said mold board with said frame and vertically adjustable on the mold board, and a wing board extending laterally along the lower edge of said mold board and adjustable vertically with respect thereto.

2. In a device of the kind described, a longitudinal strip provided with rollers and adapted to move longitudinally at one side of a temporary mold and having a lateral projecting frame, a mold board depending from said frame and having its forward end formed with a certain configuration, said mold board projecting rearwardly from said frame, a wing board pivoted to the inner end of the mold board, and extending parallel with the bottom horizontal edge of said mold board, and means for adjusting said wing board at an angle to said mold board.

In testimony whereof I hereunto affix my signature in presence of two witnesses.

JAMES STEPHEN WOOD CANNELL.

Witnesses:
GRANT COUTS,
E. J. MITCHELL.

---

Copies of this patent may be obtained for five cents each, by addressing the "Commissioner of Patents, Washington, D. C."